(12) United States Patent
Benderly

(10) Patent No.: US 9,770,936 B2
(45) Date of Patent: Sep. 26, 2017

(54) SYSTEM FOR AND METHOD OF PRODUCING A SECURITY MARK ON A MICRO-POROUS STRUCTURE

(71) Applicant: David Benderly, New York, NY (US)

(72) Inventor: David Benderly, New York, NY (US)

( * ) Notice: Subject to any disclaimer, the term of this patent is extended or adjusted under 35 U.S.C. 154(b) by 0 days.

(21) Appl. No.: 14/980,471

(22) Filed: Dec. 28, 2015

(65) Prior Publication Data

US 2016/0107473 A1 Apr. 21, 2016

Related U.S. Application Data

(62) Division of application No. 14/155,563, filed on Jan. 15, 2014.

(60) Provisional application No. 61/763,699, filed on Feb. 12, 2013.

(51) Int. Cl.
*B42D 25/36* (2014.01)
*B42D 25/29* (2014.01)
*B42D 25/333* (2014.01)
*B42D 25/346* (2014.01)
*B42D 25/41* (2014.01)
*B23K 26/53* (2014.01)
*B29C 44/34* (2006.01)
*B29C 35/10* (2006.01)

(52) U.S. Cl.
CPC ............. *B42D 25/36* (2014.10); *B23K 26/53* (2015.10); *B29C 35/10* (2013.01); *B29C 44/348* (2013.01); *B42D 25/29* (2014.10); *B42D 25/333* (2014.10); *B42D 25/346* (2014.10); *B42D 25/41* (2014.10); *B42D 2035/34* (2013.01); *Y10T 428/24504* (2015.01); *Y10T 428/24802* (2015.01)

(58) Field of Classification Search
CPC ...... B42D 25/29; B42D 25/30; B42D 25/333; B42D 25/324; B42D 25/337; B42D 25/342; B42D 25/41; B42D 25/435; B42D 2035/34; B23K 26/55; B23K 26/18; B23K 26/0066; B23K 26/352; B23K 26/50; B23K 26/53; B23K 26/57; B29C 59/16; B29C 44/3415; B29C 44/3438; B29C 44/3469; B29C 44/60
See application file for complete search history.

(56) References Cited

U.S. PATENT DOCUMENTS

| 2005/0064144 | A1* | 3/2005 | Cooper | B29C 55/06 428/156 |
| 2006/0251869 | A1* | 11/2006 | Herslow | B32B 3/08 428/204 |
| 2011/0127763 | A1* | 6/2011 | Benenati | B32B 7/12 283/74 |
| 2013/0099473 | A1* | 4/2013 | Harrison | B41M 3/14 283/85 |

OTHER PUBLICATIONS

What Is Teslin Paper, Arcadia ID, Nov. 23, 2011. <http://www.arcadiaid.com/synthetic-paper/teslin-peper.html>.*

* cited by examiner

*Primary Examiner* — Jeffrey Wollschlager
*Assistant Examiner* — Armand Melendez
(74) *Attorney, Agent, or Firm* — Kirschstein, Israel, Schiffmiller & Pieroni, P.C.

(57) ABSTRACT

A security mark is produced on a micro-porous, synthetic paper, structure by changing light transmission properties of light pathways through the structure. The security mark is visible when the structure is illuminated.

4 Claims, 3 Drawing Sheets

FIG. 1a
(PRIOR ART)
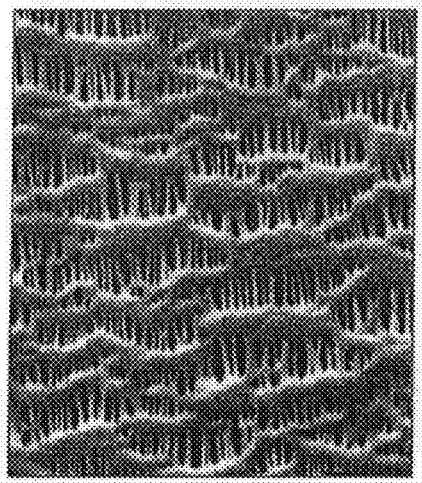
FIG. 1b
(PRIOR ART)
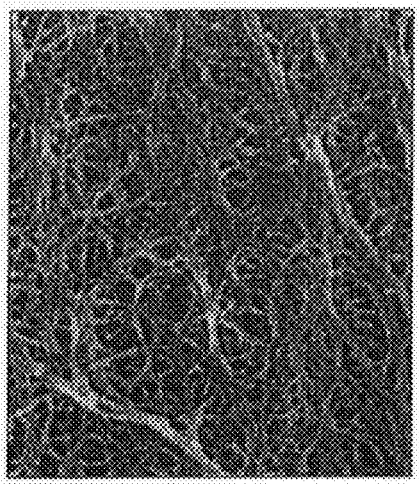
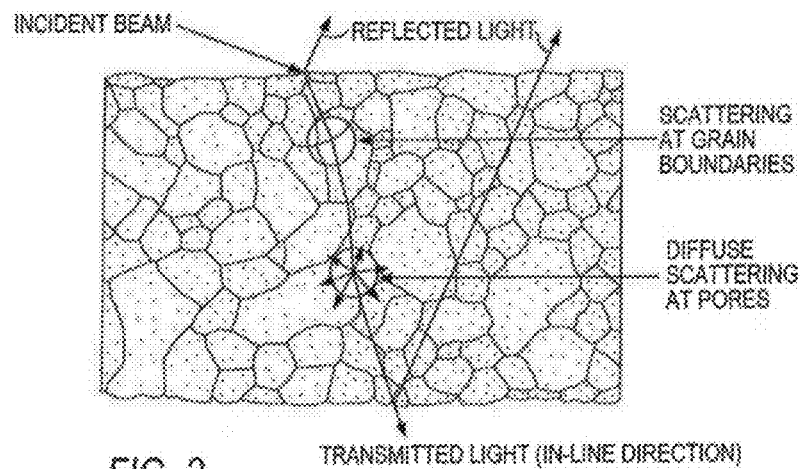
FIG. 2
(PRIOR ART)

SYSTEM FOR AND METHOD OF PRODUCING A SECURITY MARK ON A MICRO-POROUS STRUCTURE

CROSS REFERENCE TO RELATED APPLICATION

This application claims the priority benefit of U.S. Provisional Patent Application Ser. No. 61/763,699, filed Feb. 12, 2013, the entire contents of which are hereby incorporated herein by reference thereto.

FIELD OF THE DISCLOSURE

The present disclosure relates generally to a system for, and a method of, producing a security mark, also sometimes known as a watermark, on a micro-porous structure, including, but not limited to, a hydrophilic, polymeric sheet, substrate, material or membrane, also sometimes known as synthetic paper, by selectively modifying the light-transmitting characteristics of the micro-porous structure. As used herein, the terms "synthetic paper", "micro-porous structure", "micro-porous sheet", "micro-porous substrate", "micro-porous material", and "micro-porous membrane" are interchangeable.

BACKGROUND

Security marks or watermarks are often made for purposes of authentication, brand protection, or production and protection, of valuable documents, such as bank notes, passports, drivers' licenses, authentication labels, tax stamps, and like documents to be secured. Watermarks are often used on such secured documents to provide an effective form of protection against counterfeiting. Watermark images on secured documents are typically invisible, or at least difficult to view, unless correctly back-illuminated from behind the documents.

There are several main categories of watermarks. A Fourdrinier or true watermark is made during paper manufacture. An image of the watermark is formed when different degrees of pressure are applied to the paper by a dandy roll, which contains the image, while the paper is still wet. The watermark effect is achieved by the paper being impressed, in selective areas, with a pattern of varying thicknesses, and by manipulating the amount or level of light that is transmitted through the varying thicknesses of the paper when illuminated from the back (transmitted back-light illumination). Thinner portions of the paper pass more light and appear to be lighter in color, while thicker portions of the paper absorb and block the transmitted light, and therefore appear to be darker in color. True watermarks are visible from either side of the paper when held up to the light (transmitted back-light illumination).

Another type of watermark is called the cylinder mold watermark. A shaded watermark, first used in 1848, incorporates tonal depth and creates a grey scale image. Instead of using a wire covering for the dandy roll, the shaded watermark is created by areas of relief on the roll's outer surface. Once dry, the paper may then be rolled, again to produce a watermark of even thickness, but with varying density. The resulting watermark is generally much clearer and more detailed than that made by the dandy roll process, and, as a result, cylinder mold watermark paper is the preferred type of watermarked paper for banknotes, passports, motor vehicle titles, and like documents where it is an important anti-counterfeiting measure.

An artificial, pseudo, or simulated watermark is typically created by printing an image in opaque white ink, transparent ink, or by using varnish. They will all produce an image that is visible only on the printed side of the paper and viewed at an angle illuminated by reflected light. Artificial watermarks are applied after the paper manufacturing process. They can be applied by the paper manufacturer, or by the printer. An artificial watermark can be seen from one side only, and is generally applied to the back side of the document, but can be applied to the front side as well.

Although the watermarking making methods described above are satisfactorily used with regular paper, i.e., cellulose pulp fibers pressed into a sheet, such methods have not been successfully applied to synthetic paper, i.e., hydrophilic, polymeric, micro-porous structures having a multitude of pores. Such synthetic paper is commonly used for secured documents, and is typically used where extraordinary durability, ease of printing and built-in security are critical.

Examples of hydrophilic, micro-porous, and polymeric structures, sheets, substrates, membranes or materials, which could be used as synthetic papers, include, but are not limited to, polyolefins, polyesters, polyvinyl halides, and acrylics with micro-voided structures. Preferred among these examples is a micro-porous substrate commercially available under the trademark "Teslin®" from PPG Industries, as defined in U.S. Pat. No. 4,833,172, the entire contents of which are hereby incorporated herein by reference thereto. A micrograph view of a Teslin® substrate, as seen by a scanning electron microscope, in accordance with the known art, is depicted in FIG. 5.

FIG. 1a depicts the structure of a micro-porous, polyolefin, structure made by a dry process in accordance with the known art, and FIG. 1b depicts the same micro-porous structure made by a wet process in accordance with the known art. As illustrated, each micro-porous structure is non-isotropic, that is, the pores or micro-void shapes and distributions of pores or micro-void sizes are not the same in planes perpendicular to the outer surface of the structure as compared to planes parallel to the outer surface of the structure. In the case of a Teslin® substrate, silica and the clays are the preferred siliceous fillers. Of the silica's, precipitated silica, silica gel, or fumed silica are most often used. In addition, minor amounts, usually less than about 5 percent by weight, of other materials used in processing, such as lubricant, plasticizer, processing plasticizer, organic extraction liquid, surfactant, water, and the like, may optionally also be present in the Teslin® substrate.

In the case of the Teslin® substrate, the micro-porous structure is stretched in at least one stretching direction. On an impregnant-free basis, pores constitute at least 50 percent, and preferably, up to more than 80 percent by volume of the micro-porous structure. In many cases, the pores constitute from about 60 to about 75 percent by volume of the precursor micro-porous structure. In all cases, the porosity of the micro-porous structure is, unless impregnated after stretching, greater than that of the precursor micro-porous structure. After stretching has been accomplished, the micro-porous structure may optionally be sintered, annealed, heat-set and/or otherwise heat-treated. During these optional steps, the stretched micro-porous structure is usually held under tension so that it will not markedly shrink at the elevated temperatures employed, although some relaxation amounting to a small fraction of the maximum stretch ratio is frequently permitted.

Following stretching and any heat treatments employed, tension is released from the stretched, micro-porous structure. After the micro-porous structure has been brought to a temperature at which, except for a small amount of elastic recovery amounting to a small fraction of the stretch ratio, it is essentially dimensionally stable in the absence of tension. Elastic recovery under these conditions usually does not amount to more than about 10 percent of the stretch ratio.

As shown in the known art of FIG. 2, the extinction of the light or luminous flux passing through a micro-porous structure occurs as a result of light scattering by the processes of reflection, refraction, interference and diffraction from the high degree of interconnectivity through the entire matrix of the structure. The scattering of light is due to gas-solid interfaces. The refractive index mismatch at the void/material interfaces is large, and, as a result, multiple scattering is unavoidable. This gives the bulk material its familiar white opaque appearance. In addition, some waveguide effect takes place within the interconnected membrane web. Light may be confined in the middle layer by total internal reflection. This occurs only if the dielectric index (refractive index) of the middle layer is larger than that of the surrounding layers. In addition, some light penetrates interconnected surface pores, bringing some luminous flux subsurface. In the Teslin® substrate, which is highly impregnated with the aforementioned fillers, filler particles could act as a light barrier, or as a light reflector and diffuser.

As shown for a Teslin® substrate in the following Table 1, the amount of light transmission, i.e., the transmittivity or light transmission characteristic, of the substrate is correlated to the material thickness of the substrate. As an example, a 10 mils Teslin® substrate will transmit only 8 percent of the original light source lumens. Greater thicknesses will transmit less light, and vice versa.

TABLE 1

| | Gauge (mils) | | | | | | | | |
| --- | --- | --- | --- | --- | --- | --- | --- | --- | --- |
| | 5.7 | 7 | 8 | 10 | 10.5 | 12 | 14 | 14 | 18 |
| Gauge (µm) | 145 | 178 | 203 | 254 | 267 | 305 | 356 | 356 | 457 |
| Transmission (%) | 17 | 15 | 11 | 8 | 9 | 6 | 5 | 4 | 3 |

Both the Fourdrinier watermark and the artificial watermark could be produced in micro-porous structures, sheets, substrates, materials and membranes. However, due to the fundamental differences between the structures of regular paper and synthetic paper, as described above, producing effective security marks on such micro-porous structures requires different methods. Accordingly, it would be desirable to reliably and effectively produce such security marks on such micro-porous structures.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1a depicts a structure of a micro-porous, polyolefin structure made by a dry process in accordance with the Prior Art, and FIG. 1b depicts the same micro-porous structure made by a wet process in accordance with the Prior Art.

FIG. 2 is a cross-sectional view depicting light behavior in a micro-porous structure in accordance with the Prior Art.

Figure 3:
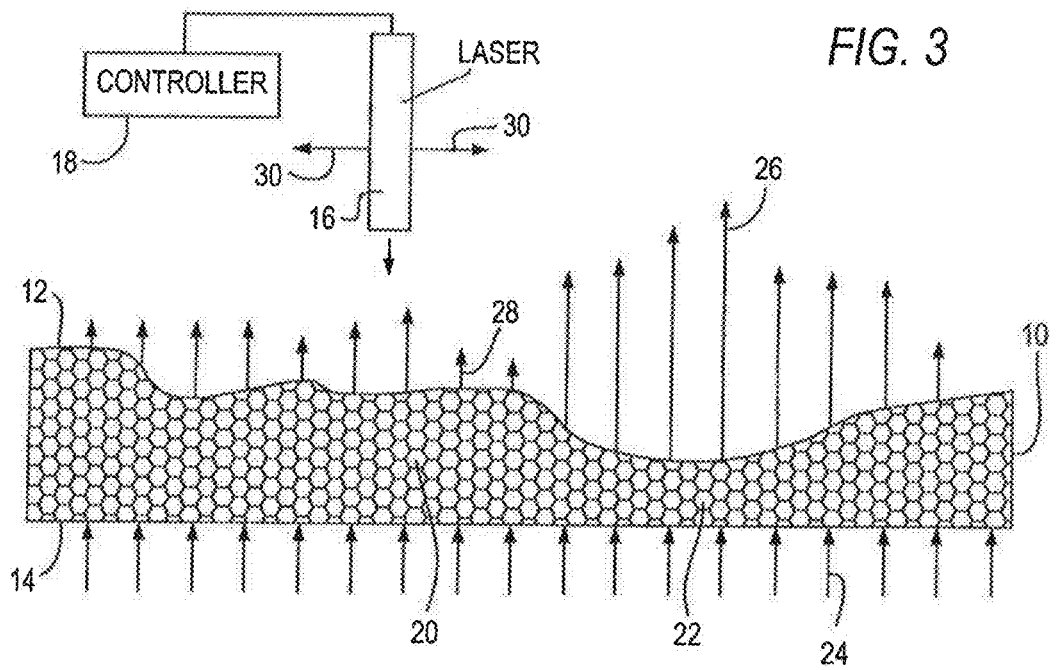
FIG. 3 depicts a method of making a security mark in accordance with one embodiment of this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this invention, a method of producing a security mark on a micro-porous structure or document to be secured, is performed by forming selected portions of the micro-porous structure in a pattern corresponding to the security mark to be produced, and by changing light transmission characteristics of the selected portions to transmit light through the selected portions at different light levels to render the security mark visible when the micro-porous structure is illuminated. Advantageously, the micro-porous structure is a polymeric sheet containing a multitude of pores that constitutes at least 50 percent by volume of the micro-porous structure, for example, the above-described Teslin® substrate.

In one embodiment, the forming is performed by scanning a laser beam relative to the micro-porous structure in the pattern, and the changing is performed by ablating the selected portions to different thicknesses corresponding to the different light levels. In another embodiment, the forming is performed by scanning radiant energy relative to the micro-porous structure in the pattern, and the changing is performed by distorting pores of the micro-porous structure at the selected portions to different sizes and/or shapes corresponding to the different light levels. In still another embodiment, the forming is performed by forming a die in the shape of the pattern, and the changing is performed by heating the die, and by pressing the heated die into contact with the micro-porous structure until pores of the micro-porous structure at the selected portions are distorted to different sizes and/or shapes corresponding to the different light levels.

In accordance with another feature of this invention, a system for producing a security mark on a micro-porous structure to be secured, includes means for forming selected portions of the micro-porous structure in a pattern corresponding to the security mark to be produced, and means for changing light transmission characteristics of the selected portions to transmit light through the selected portions at different light levels to render the security mark visible when the micro-porous structure is illuminated.

In one embodiment, the changing means includes a laser for emitting a laser beam operative for ablating the selected portions to different thicknesses corresponding to the different light levels, and the forming means includes a controller for scanning the laser beam relative to the micro-porous structure in the pattern. In another embodiment, the changing means includes a radiant energy source for emitting radiant energy operative for distorting pores of the micro-porous structure at the selected portions to different sizes and/or shapes corresponding to the different light levels, and the forming means includes a controller for scanning the radiant energy relative to the micro-porous structure in the pattern. In still another embodiment, the forming means is a die in the shape of the pattern, and the changing means is operative for heating the die, and for pressing the heated die into contact with the micro-porous structure until pores of the micro-porous structure at the selected portions are distorted to different sizes and/or shapes corresponding to the different light levels.

In accordance with still another feature of this invention, a secured document comprises a micro-porous structure configured as a polymeric sheet having opposite major surfaces and containing a multitude of pores that constitutes at least 50 percent by volume of the micro-porous structure, selected portions of the micro-porous structure being arranged in a pattern corresponding to a security mark to secure the document, and the selected portions having changed light transmission characteristics to transmit light through the selected portions at different light levels to render the security mark visible when the micro-porous structure is illuminated from at least one of the major surfaces.

In one embodiment of this invention, as shown in FIG. 3, a Fourdrinier watermark on a micro-porous structure 10 is produced by a pressure-free and heat-free process by selectively removing bulk material of outer layers in selected areas from an upper major surface 12 of the micro-porous structure 10 without disturbing remaining bulk material of inner layers of the micro-porous structure 10 that are below the selected areas. The selected areas correspond to the configuration or design of a security mark 40 (see FIG. 6b), as described below. Although FIG. 3 depicts the removal of bulk material of outer layers in selected areas only from the upper major surface 12, it will be understood that the bulk material of the outer layers could alternatively be removed in selected areas from a lower major surface 14 of the micro-porous structure 10 and, in another variant, the bulk material of the outer layers could be removed in selected areas from both the upper major surface 12 and the lower major surface 14.

The removal of the bulk material of such outer layers causes the micro-porous structure 10 to have thicker portions, such as exemplary thick portion 20, and thinner portions, such as exemplary thin portion 22. When illuminated by back-transmitted light (as represented by the arrows 24 of uniform height) that is incident on the lower surface 14 in FIG. 3, more light will be transmitted and pass through the thin portion 22 (as represented by the taller arrow 26 in FIG. 3), and less light will be transmitted and pass through the thick portion 20 (as represented by the shorter arrow 28 in FIG. 3). When the micro-porous structure 10 is viewed from the upper surface 12, the greater and lesser levels or extents of the transmitted light 26, 28 passing through the micro-porous structure 10 create a visible image of the security mark 40.

The selective removal of bulk material from the outer layers of the micro-porous structure 10 without disturbance to the bulk material of the underlying micro-porous structure 10 is achieved by relative movement between a radiant energy source 16 and the micro-porous structure 10. The radiant energy source 16 can be any laser, e.g., a 193 nanometer excimer laser, or a picosecond to femtosecond pulse duration, solid-state laser. These types of laser 16 selectively remove the bulk material of the outer layers without creating any heat affected zones (HAZ), such as, by example, a "cold laser" ablation technique. By way of numerical example, the laser 16 can remove from 1 percent to 90 percent of the entire thickness of the micro-porous structure 10 in the selected areas. The relative movement can be achieved, for example, by moving a laser beam emitted by the laser 16 in a scan pattern, as illustrated by the arrows 30, under the control of a programmed microprocessor or controller 18, or by moving the micro-porous structure 10 in a pattern underneath a stationary laser 16, or by simultaneously moving both the laser beam and the micro-porous structure 10. In another variation, a scan mirror can be positioned in the path of the laser beam output by the laser 16, and the mirror can be swept or oscillated by the controller 18 in the scan pattern across the upper surface 12 of the micro-porous structure 10. The pattern is preferably two-dimensional, but can also be one-dimensional.

In one embodiment, the selective ablation of bulk material from the micro-porous structure 10 without disturbance to the underlying micro-porous structure 10 is critical to the outcome and production of the security mark. Any disturbance to the structure 10 might block light-transmitting pathways through the structure 10, which, in turn, will produce an adverse effect on this type of security mark. A highly controlled ablation process assures that, even in areas of greater bulk material removal, the remaining structure is undisturbed. Thinner portions 22 will have a reduced ability to block passing light as compared to thicker portions 20. This type of security mark could be observed from both sides of the micro-porous structure 10 while illuminating the structure 10 from the back. A dual-sided security mark is regarded as valuable and desirable as only "true" watermarks can be observed from both sides in regular paper.

Figure 4:
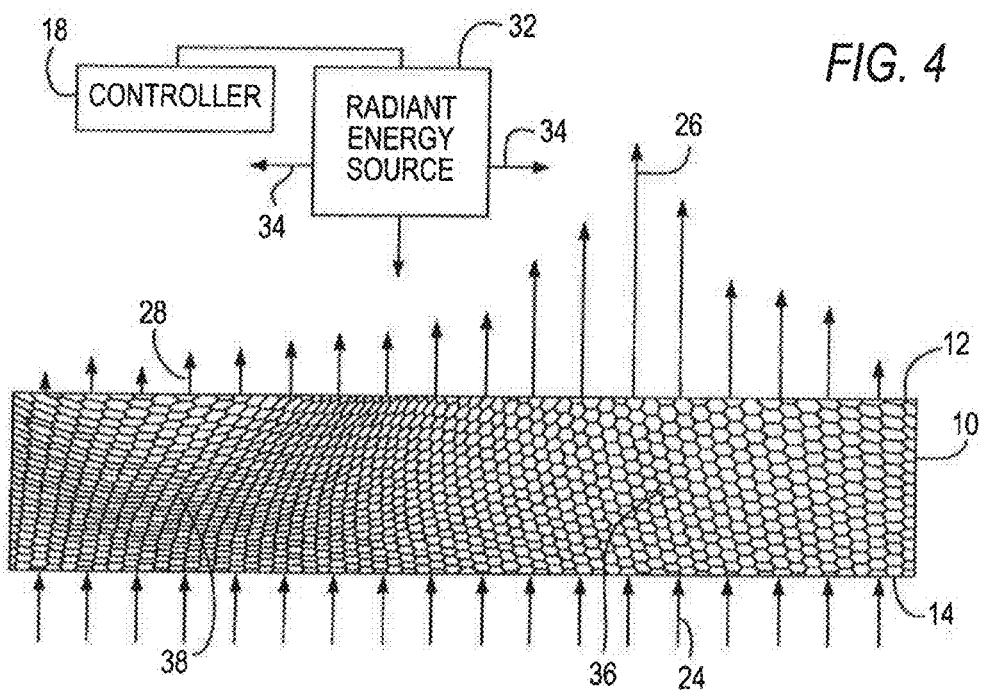
FIG. 4 depicts a method of making a security mark in accordance with another embodiment of this invention.
Figure 5:
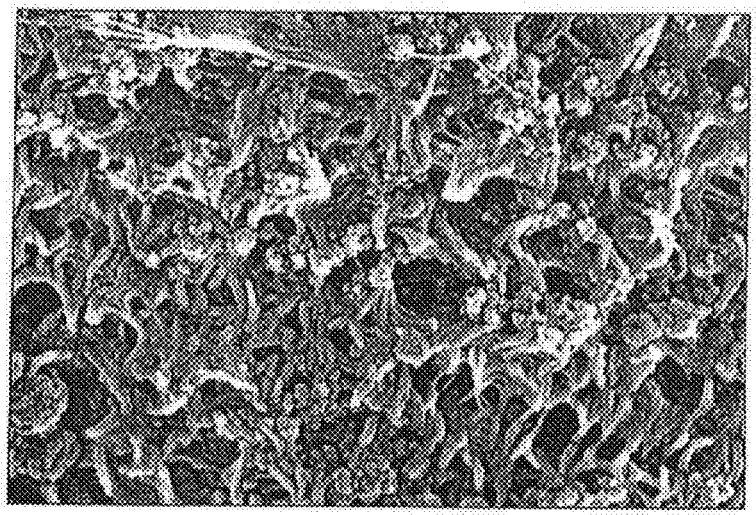
FIG. 5 is a scanning electron microscope (SEM) micrograph of a Teslin® substrate in accordance with the Prior Art.

In another embodiment of this invention, as shown in FIG. 4, ablation and removal of portions or layers of bulk material from the micro-porous structure 10 are not performed. Instead, a radiant energy source 32 under the control of the controller 18 is used to emit and direct radiant energy to the micro-porous structure 10, to thereby selectively disturb the light-transmitting pathways through the micro-porous structure 10. The radiant energy source 32 can be, for example, a long wavelength laser that emits infrared radiation, a carbon dioxide laser, a solid state laser, a fiber laser, a disk laser, a bulk rod laser such as a ND/YAG laser, a reactive plasma radiator, or even a heat source.

The radiant energy is preferably focused at the outer surface 12 or 14 of the micro-porous structure 10. More specifically, the radiant energy source 32 is operated to interact with the micro-porous structure 10 and affect its light-transmission pathways in a process that causes opposing forces to be formed on the structure 10. The cumulative impact of the complex material interaction caused by exposure to the radiant energy is highly consistent and can be repeated with predictable results.

As described above, as part of the manufacturing process, when a Teslin® substrate is used as the micro-porous structure 10, the Teslin® substrate is stretched in order to increase the volume of its pores. The incident radiant energy, which is focused at the outer surface 12 or 14 of the Teslin® substrate, causes a local rise in temperature, both on the outer surface 12 or 14 and in the sub-surface of the substrate, thereby allowing the material of the substrate to flow and anneal. This causes the pores of the substrate to shrink in size and/or distort in shape. When the area of exposure of the incident radiant energy is minimal or localized, the thickness of the structure 10 does not change, at least not appreciably in a noticeable way, as the rest of the bulk material causes an uneven, internal shrinking and distortion of the pores.

The shrinking and distortion in the surface pores and in the internal matrix structure causes a change in the light transmission path though the structure 10. The exposure of the outer surface to the incident radiant energy causes the micro-porous structure 10 to have larger pores, such as exemplary large pore 36, and smaller pores, such as exemplary small pore 38. When illuminated by back-transmitted light (as represented by the arrows 24 of uniform height) that is incident on the lower surface 14 in FIG. 4, more light will be transmitted and pass through the larger pores 36 (as represented by the taller arrow 26 in FIG. 4), and less light will be transmitted and pass through the smaller pores 38 (as represented by the shorter arrow 28 in FIG. 4). When the micro-porous structure 10 is viewed from the upper surface 12, the greater and lesser levels or extents of the transmitted light 26, 28 passing through the micro-porous structure 10 of FIG. 4 create a visible image of the security mark 40.

Under the control of the controller 18, relative movement between the radiant energy source 32 and the structure 10 can be achieved, for example, by moving the source 32 in a pattern, as illustrated by the arrows 34 under the control of the controller 18, or by moving the micro-porous structure 10 in a pattern underneath a stationary source 32, or by simultaneously moving both the source 32 and the micro-porous structure 10. In another variation, a scan mirror can be positioned in the path of the radiant energy output by the source 32, and the mirror can be swept or oscillated by the controller 18 in a pattern across the upper surface 12 of the micro-porous structure 10. The pattern is preferably two-dimensional, but can also be one-dimensional. By way of non-limiting example, if a carbon dioxide laser is employed as the radiant energy source 32, then the laser beam output is typically focused to a spot size of about 100-500 microns in diameter, and the scan rate is about 2,000 inches per second.

Thus, the light-transmitting pathways of the structure 10 of FIG. 4 can be changed in a predictable manner, thereby allowing production of the security mark 40 in a two-tone, or even a full grey scale, method. At elevated radiant energy levels, some material breakdown may occur, which might also cause darkening of the material. This, however, might not be a desirable outcome, as it weakness the structural integrity and unique properties.

Figure 6A:
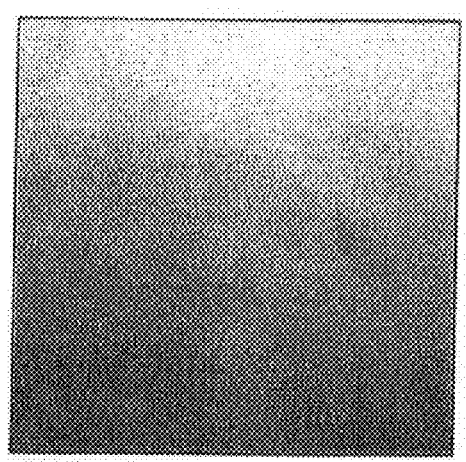
FIG. 6a depicts a document illuminated from a front side thereof in which a security mark made in accordance with this invention is not readily visible.
Figure 6B:
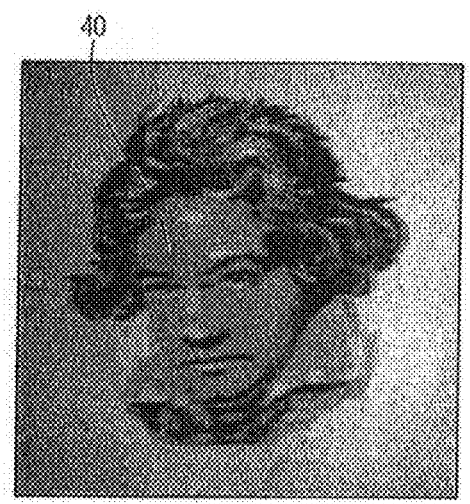
FIG. 6b depicts the same document illuminated from a rear side thereof in which the security mark made in accordance with this invention is readily visible.

This type of security mark 40 could be observed from both sides of the structure 10 while illuminating the structure 10 from the back. A dual-sided watermark is regarded as valuable and desirable as only "true" watermarks can be observed from both sides in regular paper. FIG. 6a depicts a document illuminated from a front side thereof in which a security mark made in accordance with this invention is not readily visible, and FIG. 6b depicts the same document illuminated from a rear side thereof in which the security mark 40 made in accordance with this invention is readily visible. Although FIG. 6b illustrates the security mark 40 configured as a facial image, it will be understood that the security mark can comprise any image or indicia, including symbols and alphanumeric text. The security mark is preferably two-dimensional, but can also be one-dimensional.

In another embodiment of this invention, the security mark 40 is produced on the micro-porous structure 10 by directly contacting the radiant energy source 32, advantageously configured as a heat source, with the structure 10. This direct contact method selectively seals light-transmitting pathways through the structure 10, thereby making the contact areas appear darker when illuminated by the transmitted light 24 (back illumination). Although it is possible to adjust and reduce the light transmission along any light pathway by controlling temperature and/or pressure against the structure 10, it is harder to control, and the heat contact process is preferred. A grey scale image could still be achieved by grey scale emulation. In this method, a very small area is exposed to the heat source 32, thereby producing a single pixel or single image element. By varying pixel size (line screen) or pixel density (dithering), a continuous tone grey scale image is emulated.

The heat source 32 could be configured as a die in the shape of the security mark 40, which will be pressed against the structure 10. The die could be a flat platen, or a curved platen placed on a cold roller drum. The heat source 32 could also be a computer-controlled printing head, analogous to a thermal printer head, which could control temperature on pinpoint heating elements arranged in either a linear or a matrix array arrangement. The pinpoint elements are heated and cooled selectively, thereby deforming and sealing the light transmission pathways of the structure 10. As with previous methods, this method does not require any inks or other consumables. The security mark 40 is again solely produced by the manipulation of the light transmission pathways.

It will be understood that each of the elements described above, or two or more together, also may find a useful application in other types of constructions differing from the types described above.

While the invention has been illustrated and described as embodied in a system for, and a method of, producing a security mark, as well as a secured document, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing a security mark on a micro-porous structure to be secured, comprising:
    configuring the micro-porous structure as a polymeric porous sheet having a uniform thickness, and with an internal network of sub-surface pores between opposite, outer surfaces of the porous sheet;
    stretching the porous sheet;
    directing radiant energy to the porous sheet;

scanning the radiant energy relative to the porous sheet in a pattern corresponding to the security mark to be produced after the porous sheet has been stretched; and changing light transmission characteristics of the porous sheet to transmit light through the porous sheet at different light levels to render the security mark visible when the porous sheet is illuminated, by distorting the internal network of sub-surface pores within the porous sheet to different sizes and shapes corresponding to the different light levels, by not ablating the outer surfaces of the porous sheet, and by maintaining the uniform thickness of the porous sheet, at least some of the sub-surface pores being shrunk by the scanned radiant energy to transmit less of the light through the porous sheet.

2. The method of claim 1, and configuring the sub-surface pores to constitute at least 50% by volume of the porous sheet.

3. The method of claim 1, and supplying the radiant energy from one of a laser, a plasma radiator, and a heat source.

4. The method of claim 1, and supplying the radiant energy from a radiant energy source, and wherein the scanning is performed by moving one of the radiant energy source and the porous sheet relative to the other.

* * * * *